United States Patent [19]

Andersson et al.

[11] Patent Number: 4,828,774

[45] Date of Patent: May 9, 1989

[54] POROUS CERAMIC BODIES

[75] Inventors: Clarence A. Andersson, Wallingford; Deborah P. Partlow; Bulent E. Yoldas, both of Pittsburgh, all of Pa.

[73] Assignee: The United States of America as represented by the Secretary of the Air Force, Washington, D.C.

[21] Appl. No.: 11,085

[22] Filed: Feb. 5, 1987

[51] Int. Cl.$^4$ .................. C04B 35/76; C04B 35/84; B32B 18/00

[52] U.S. Cl. ..................... 264/60; 156/89; 264/86; 264/87; 428/307.3; 428/307.7; 428/311.5; 428/312.8; 428/408; 428/689; 428/697; 428/698; 428/701; 501/12; 501/95

[58] Field of Search ............ 156/89; 264/60, 86, 264/87; 501/12, 95

[56] References Cited

U.S. PATENT DOCUMENTS

| | | | |
|---|---|---|---|
| 3,976,728 | 8/1976 | Hawthorne | 264/87 |
| 4,093,771 | 6/1978 | Fletcher et al. | 65/30.1 |
| 4,302,502 | 11/1981 | Narumiya | 428/311 |
| 4,381,333 | 4/1983 | Beggs et al. | 428/312.6 |
| 4,395,456 | 7/1983 | Jackson et al. | 428/304.4 |
| 4,545,924 | 10/1985 | Ritter | 501/95 |
| 4,585,500 | 4/1986 | Minjolle et al. | 264/60 |
| 4,671,911 | 6/1987 | Garnier | 264/60 |
| 4,696,710 | 9/1987 | Minjolle et al. | 264/86 |
| 4,735,756 | 4/1988 | Rausch | 264/86 |
| 4,737,326 | 4/1988 | Wirth et al. | 264/86 |

FOREIGN PATENT DOCUMENTS 32344 4/1981 Japan ..................... 501/12

OTHER PUBLICATIONS

Yoldas, *J. of Materials Science*, vol. 12, 1203–1208 (1977).

Johnson, *Am. Ceram. Soc. Bull.*, vol. 64 (12) 1597–1602 (1985).

*Primary Examiner*—James C. Cannon
*Attorney, Agent, or Firm*—Charles E. Bricker; Donald J. Singer

[57] ABSTRACT

A porous body consisting of a felted fibrous skeleton covered with and bonded together by a ceramic material is provided. Also provided are methods for making such a porous body which comprise the use of ceramic polymer solutions.

17 Claims, No Drawings

POROUS CERAMIC BODIES

RIGHTS OF THE GOVERNMENT

The invention described herein may be manufactured and used by or for the Government of the United States for all governmental purposes without the payment of any royalty.

BACKGROUND OF THE INVENTION

This invention relates to porous ceramic bodies.

Renewed interest in lightweight porous ceramics has been stimulated by the need for materials having low thermal expansion, low dielectric constant, and/or low density for certain high-tech applications. For example, in space mirror fabrication, there exists a need for a lightweight backing for a 10-meter diameter mirror surface of high optical perfection. The backing, as well as the mirror surface, must have near-zero thermal expansion because of its large size and the need to maintain its optical figure. Another example is in the design of radomes, where a material of low dielectric constant may be required to complete a particular sandwich design. Yet another example is in the manufacture of space shuttle tiles, where good insulation properties have been achieved but dimensional stability on heating during re-entry still poses problems. Ideally, a lightweight porous ceramic body such as an insulating tile, would be formed using a bonding agent, such as silica, with fibers having low thermal expansion, such as silica fibers. Unfortunately, the high temperatures required for such a process as well as the chemical reactions that might occur between the materials at high temperatures have made such forming methods impractical. Further, addition of fluxing agents to reduce the required processing temperatures have led to increased thermal expansion of the bonding agent, thereby decreasing the operational temperature of the tile.

Accordingly, it is an object of the present invention to provide an improved method for fabricating porous ceramic bodies.

it is another object of the present invention to provide a porous ceramic body.

Other objects, aspects and advantages of the present invention will be apparent to those skilled in the art after review of the following detailed description of the invention.

SUMMARY OF THE INVENTION

In accordance with the present invention there is provided an improved method for making a lightweight porous ceramic body which comprises the steps of:
(a) providing a ceramic polymer solution;
(b) blending high-strength fibers with the polymer solution to provide a mixture;
(c) felting the mixture;
(d) drying the resulting felt; and
(e) firing the dried felt.

Alternatively, the fibers may be felted, then impregnated with the ceramic polymer solution, then dried and fired.

The polymer solution is an inorganic oxide network containing glass-forming elements such as Si, Al, Ti, Zr and the like and optionally, modifying elements such as Mg, B and the like. The oxide network is formed by controlled hydrolysis of an organo-metallic compound such as a metal alkoxide. The net reaction to form an anhydrous oxide is generally represented by

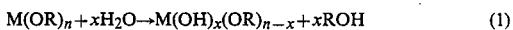  (1)

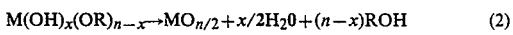  (2)

The hydrolysis reaction (1) may be catalyzed by the addition of acid or base. Depending on pH and water content, the hydrolysis of, for example, tetraethylorthosilicate (TEOS) can result in the formation of polymeric species ranging from polysiloxane chains to colloidal particles of essentially pure silicon dioxide. Conditions employed in the preparation of monolithic glasses or ceramics normally consist of the hydrolyzation of the alkoxide precursors with a small to large excess of water (in Equation 1, above, x greater than n/2) at low to intermediate pH (about 1 to 9). These conditions can result in structures that are intermediate between linear chains and colloidal particles. The oxide network can be dried, then thermally converted to glass or ceramic. Multicomponent glasses/ceramic may be similarly prepared. As used hereinafter and in the claims, the term "ceramic" is intended to include any material prepared as described above, including silica glass as well as other amorphous oxides and mixtures of oxides.

For use in the present invention, a solution is prepared containing at least about 5 weight percent, preferably at least about 10 weight percent equivalent oxide. The metal alkoxides may be prepared using techniques known in the art. For example, silicon tetrakis isopropoxide may be prepared by reacting silicon tetrachloride with isopropyl alcohol. As another example, aluminum trisisopropoxide may be prepared by the reaction of aluminum metal foil with excess isopropyl alcohol using mercuric chloride as a catalyst.

The metal alkoxide is diluted with a C1 to C4 alcohol, e.g., methanol, ethanol, n-propanol, i-propanol, n-butanol, i-butanol, t-butanol or sec-butanol, preferably with the alcohol corresponding to the alkoxide group, to a concentration sufficiently low to avoid gellation when later hydrolyzed, yet sufficiently high to provide the desired concentration of equivalent oxide.

The ceramic materials include silicates, aluminates, titanates, zirconates and the like, as well as combinations thereof, such as the aluminosilicates. These materials may optionally be modified with one or more of boron, alkali metals, alkaline earth metals, lead and the like.

The fibers employed according to the invention are high strength fibers such as, for example, carbon or graphite, silica, silicon carbide, silicon nitride, silicon carbide-coated boron, boron carbide-coated boron, silicon-coated silicon carbide, alumina, beryllium-titanium composites, boron-alumino silicate, and the like. The fibers are chopped, cut or otherwise reduced in length to a length suitable for felting. In general, the average fiber length is about 0.05 to 0.5 inches, preferably about 0.01 to 0.25 inches.

In accordance with one embodiment of the invention, fibers are combined with a polymer solution in a weight ratio of about 1:500 to 1:25, preferably about 0.75:100 to 1.15:100, using a polymer solution containing at least about 10.0 weight percent equivalent oxide. The mixture of fibers and polymer solution is mixed to ensure homogeneous dispersion of the fibers in the solution. The mixture is then filtered under vacuum to felt the fibers. The resulting felt is removed from the filtration apparatus and dried. The dried felt can then be fired to convert the polymer solution to the corresponding ceramic.

In accordance with another embodiment of the invention, the fibers are combined with water, mixed thoroughly, then filtered under vacuum to felt the fibers. The felted material may be pressed, while still in the filtration apparatus, to increase its density. The felt is removed from the filtration apparatus and dried. The fibrous pad is impregnated with a polymer solution and dried, then fired to convert the polymer solution to the corresponding ceramic. It is also within the scope of this invention to impregnate a fibrous pad containing a quantity of water with a polymer precursor solution containing at least one metal alkoxide diluted with alcohol to form the oxide network in situ.

The felted article may be shaped, on at least one major face, by using a filtering element having a complementary shape. Such a shaped filtering element may be made using glass- or metal-sintering techniques. After firing, the felted article may be further shaped by grinding, sanding or other machining methods.

Conversion of the polymer solution to ceramic is accomplished by heating the article to an elevated temperature of about 350° to 1000° C. A monolithic silica polymer solution may be converted to silica glass by heating the article to about 350° to 500° C.; a mullite polymer solution may be converted to amorphous mullite by heating the article to about 500° to 700° C. (see Yoldas el al, Ser. No. 867,727, filed May 28, 1986, now U.S. Pat. No. 4,687,652) and amorphous mullite can be converted to the crystalline form by heating the article to about 985° C. Conversion temperatures for other polymer solutions can easily be determined by those skilled in the art. The time of heating can range from about 10 to 60 minutes. Generally, heating is carried out in air, however, it is also within the scope of this invention to employ an inert atmosphere such as helium, argon or the like.

Following the initial firing, the resulting rigidized felt may be impregnated with the polymer solution, dried and fired. This cycle is repeated as desired to increase the density of the article and/or decrease its porosity. The density of the article can alternatively be increased by hot pressing the article at about 500° to 1200° C. for about 10 to 60 minutes using a pressure of about 50 to 500 psi. The polymer solution used for these subsequent cycles should be more dilute than the solution used for the initial impregnation in order to infiltrate the felt, generally about one-half the concentration on the initial solution. It is presently preferred to employ a polymer solution for these cycles having a concentration not greater than about 5 weight percent equivalent oxide. The water of hydrolysis should be at least about 2 moles per mole of alkoxide to enhance the liberation of organic material. Impregnation of the rigidized felt may be accomplished by dipping the felt into the polymer solution. Alternatively, the rigidized felt is wet with water then impregnated with a polymer precursor solution, as described previously.

For certain applications, such as, for example, the thermal control structure in U.S. Pat. No. 4,381,333, one or more outer layers of the same or different glass or ceramic material may be added to the rigidized felt. For example, a rigidized felt consisting of silica fibers in a silica matrix, prepared and densified as described previously, may be coated on one surface with a borosilicate polymer solution, dried, fired and repeated as necessary to built up a desired thickness of this layer.

Alternatively, such an outer layer may be formed using conventional ceramic tape technology. Briefly, such tapes are formed by blending a mixture of ceramic powder, organic polymer binder and solvent, and casting the resulting mixture on a smooth release film. When the solvent evaporates, a flexible sheet remains which can be cut into tapes. When added strength is desired, fibrous reinforcement, such as the fibers described previously, may be incorporated into the tape in amounts of about 5 to 20 volume percent. The flexible tape can be attached to the porous felt core by softening the organic binder with solvent or a solvent/ceramic powder slurry and pressing the tape onto the felt. The resulting composite preform is then heated to a temperature appropriate for sintering the ceramic outer layers.

The following examples illustrate the invention:

EXAMPLE I 2.0 g of chopped silica fibers were combined with 200 g of a polymer solution containing 10.0 weight percent equivalent silicon dioxide in ethanol, hydrolyzed with 8 moles of water per mole of silicon. This mixture was blended at high speed for 2 minutes. The blended material was poured into a filter flask equipped with a 0.5 $\mu$m filter. Excess polymer solution was evacuated from the felt using a house vacuum system. The felt was carefully removed from the filter flask and dried at 100° C., which improved its handleability are rigidity. The dried felt was fired in air at 500° C. for one hour to convert the polymer solution to silica glass.

EXAMPLE II 8.0 g of $\frac{1}{8}$-inch chopped boron-aluminosilicate fibers (Nextel 312, 3M Company) were blended with 300 g of deionized water for 30 seconds at high speed. The blended material was poured into a filter press equipped with a sintered metal filtering element. Excess water was removed by applying a vacuum. A plunger was placed into the filter press, and the sample was pressed at 10 kg/cm$^2$. The resulting felt was carefully removed from the filter press and partially dried by heating at 70° C. for about one hour, until remaining water equaled about 8 g. The felt was then infiltrated with 160 g of a proprietary cordierite polymer precursor solution having a concentration of about 5 percent equivalent oxide. The solution was applied to the felt using an eyedropper in increments of about 40 g. The felt was dried at 60° C. between increments. The infiltrated felt was rigidized by heating in air at 400° C. for 20 minutes. The rigidized felt was densified by hot pressing at 100 psi and 1100° C. for 15 minutes.

Various modifications may be made in the present invention without departing from the spirit of the invention or the scope of the appended claims.

We claim:

1. A method for making a porous body consisting of a felted fibrous skeleton covered with and bonded together by a ceramic material which comprises the steps of:
   (a) providing a first ceramic polymer solution;
   (b) blending high strength fibers with said solution to provide a mixture;
   (c) felting said mixture;
   (d) drying the resulting felt; and
   (e) firing the dried felt; wherein said ceramic polymer solution is an alcoholic solution containing an inorganic oxide network of at least one glass-forming element formed by controlled hydrolysis of an organo-metallic compound.

2. The method of claim 1 wherein said polymer solution has an equivalent oxide concentration between about 1.0 percent and the concentration of gellation.

3. The method of claim 2 wherein said polymer solution contains about 10.0 weight percent equivalent silicon dioxide.

4. The method of claim 1 wherein said mixture contains about 0.25 to 2.5 g of said fibers per 100 g of said solution.

5. The method of claim 1 wherein said felting step comprises vacuum filtration of said mixture.

6. The method of claim 5 wherein said mixture is vacuum filtered using an apparatus having a configuration complementary to the desired shape of the felted material.

7. The method of claim 1 further comprising the steps of:
 (f) impregnating the resulting fired body with a second ceramic polymer solution;
 (g) drying the resulting impregnated body;
 (h) firing the dried body; and
 (i) repeating steps (f) to and including (h) to provide a porous body having a desired density.

8. The method of claim 7 wherein said polymer solution has an equivalent oxide concentration of about one-half of said first solution.

9. The method of claim 1 wherein said glass-forming element is selected from the group consisting of Si, Al, Ti and Zr.

10. The method of claim 9 wherein said ceramic polymer solution is modified with Mg or B.

11. A method for making a porous body consisting of a felted fibrous skeleton covered with and bonded together by a ceramic material which comprises the steps of:
 (a) felting a plurality of high-strength fibers;
 (b) providing a ceramic polymer solution;
 (c) impregnating the felt resulting from step (a) with said solution;
 (d) drying the resulting impregnated felt; and
 (e) firing the dried felt; wherein said ceramic polymer solution is an alcoholic solution containing an inorganic oxide network of at least one glass-forming element formed by controlled hydrolysis of an organo-metallic compound.

12. The method of claim 11 wherein said polymer solution has an equivalent oxide concentration between about 1.0 percent and the concentration of gellation.

13. The method of claim 12 wherein said polymer solution contains about 5.0 equivalent oxide.

14. The method of claim 13 wherein said fibers are selected from the group consisting of carbon, graphite, silica, silicon carbide, silicon nitride, silicon carbide-coated boron, boron carbide-coated boron, silicon-coated silicon carbide, alumina, Be-Ti composites and boron-aluminosilicate.

15. The method of claim 11 further comprising the steps of:
 (f) impregnating the resulting fired body with said polymer solution;
 (g) drying the resulting impregnated body;
 (h) firing the dried body; and
 (i) repeating steps (f) through (h) to provide a porous body having an desired density.

16. The method of claim 11 wherein said glass-forming element is selected from the group consisting of Si, Al, Ti and Zr.

17. The method of claim 16 wherein said ceramic polymer solution is modified with Mg or B.

* * * * *

UNITED STATES PATENT AND TRADEMARK OFFICE
CERTIFICATE OF CORRECTION

PATENT NO. : 4,828,774
DATED : May 9, 1989
INVENTOR(S) : Clarence A. Andersson et al It is certified that error appears in the above-identified patent and that said Letters Patent is hereby corrected as shown below:

Col 1, line 43, "it" should read "It".
Col 2, line 60, "0.01 should read "0.1".
Col 2, line 64, "1.15:100" should read "1.25:100".
Col 3, line 63, after "structure", insert --described--.
Col 5, claim 8, line 1, after "said", insert --second--.

Signed and Sealed this

Fourteenth Day of August, 1990

Attest:

HARRY F. MANBECK, JR.

*Attesting Officer*     *Commissioner of Patents and Trademarks*